United States Patent [19]
Erickson

[11] 4,015,736
[45] Apr. 5, 1977

[54] PORTABLE DEVICE FOR LIFTING AND MOVING AN OBJECT

[76] Inventor: Earl R. Erickson, R.R. 5, Box 550, Grand Rapids, Minn. 55744

[22] Filed: Feb. 12, 1976

[21] Appl. No.: 657,616

Related U.S. Application Data

[63] Continuation of Ser. No. 531,857, Dec. 12, 1974, abandoned.

[52] U.S. Cl. .................................. 214/390; 187/24
[51] Int. Cl.² ........................................... B60P 3/40
[58] Field of Search .......................... 214/390, 370; 280/43.23; 187/24, 25, 10, 11

[56] References Cited
UNITED STATES PATENTS

| | | | |
|---|---|---|---|
| 2,463,381 | 3/1949 | Hicks | 214/390 X |
| 2,710,759 | 6/1955 | Bayer et al. | 187/10 X |
| 2,895,567 | 7/1959 | Hall | 187/24 X |
| 2,904,201 | 9/1959 | Rhodes | 214/515 |
| 3,010,592 | 11/1961 | Chadwick | 214/390 |
| 3,145,863 | 8/1964 | Dunaski | 214/390 |
| 3,672,634 | 6/1972 | Chaffin | 214/390 X |

*Primary Examiner*—Albert J. Makay
*Attorney, Agent, or Firm*—Wicks & Nemer

[57] ABSTRACT

A device for lifting and moving an object including a first support member having a stationary frame with a movable frame slidably mounted on this stationary frame. Casters are mounted on the stationary frame for moving the device to transport an object mounted on the movable frame, together with operable means connected to the stationary frame and movable frame for lifting the movable frame relative to the stationary frame. The movable frame carries means for engagement with an object to lift the same when the movable frame is lifted, a second support member identical to the first support member together with means for maintaining the first and second support members in close proximity to the object to be moved.

1 Claim, 9 Drawing Figures

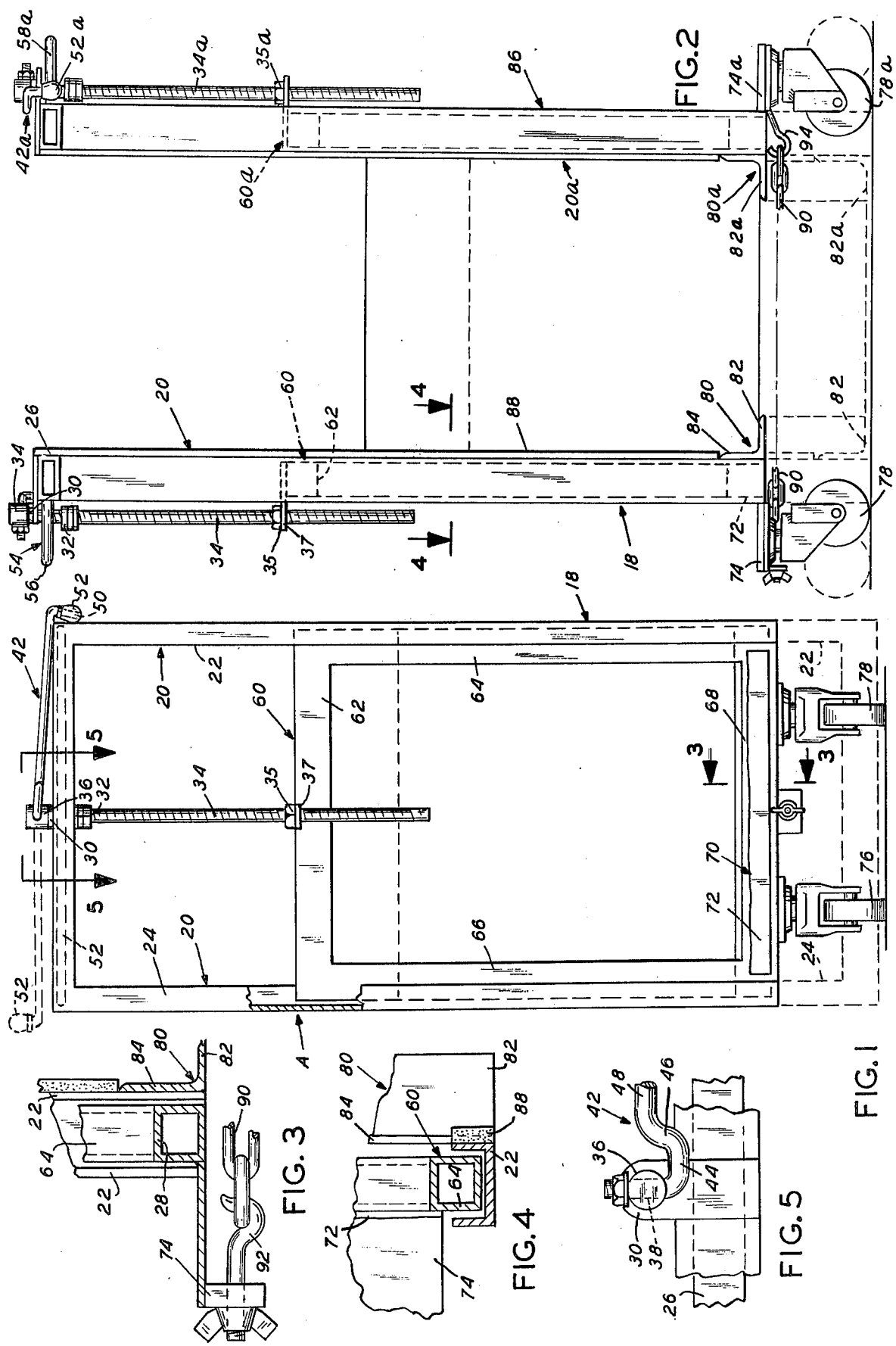

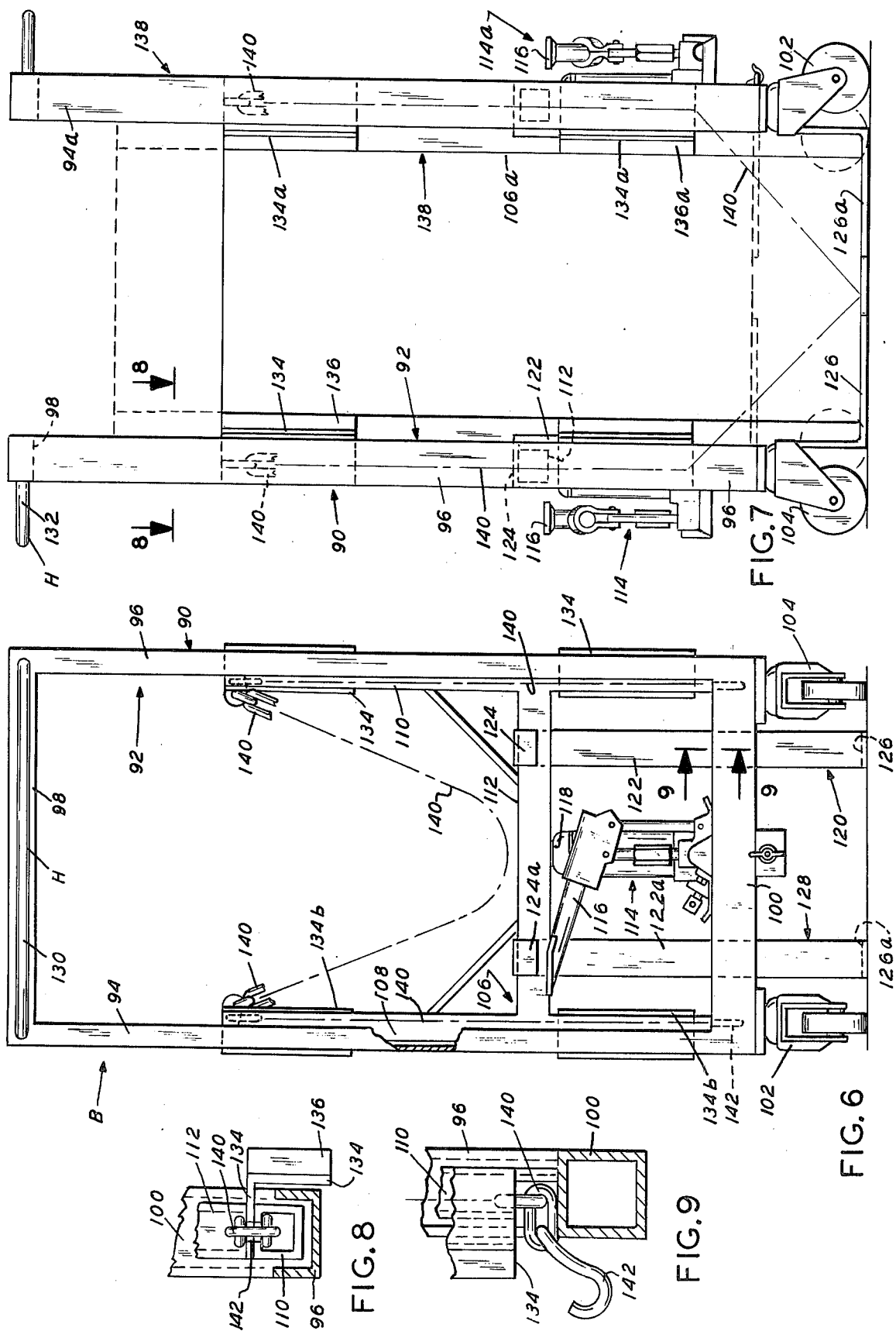

PORTABLE DEVICE FOR LIFTING AND MOVING AN OBJECT

CROSS REFERENCE

This is a continuation of application Ser. No. 531,857 filed Dec. 12, 1974, now abandoned.

SUMMARY

The invention relates to a device for lifting and moving an object with which an object is easily engaged and moved. The device includes a pair of support members each having a stationary frame and a frame movable on this stationary frame. The movable frame is engageable with an object and the frame is raised to clear the floor by operable means. The support members are both held in close proximity to the object as it is transported. The object is easily and simply lowered to the floor by the operable means.

In the drawings forming part of this application:

FIG. 1 is a front elevational view of a support member of a portable lifting and moving device embodying the invention.

FIG. 2 is a side edge view of a pair of identical supports in loading operative positions.

FIG. 3 is an enlarged sectional view on the line 3—3 of FIG. 1.

FIG. 4 is an enlarged sectional view on the line 4—4 of FIG. 2.

FIG. 5 is an enlarged view on the line 5—5 of FIG. 1.

FIG. 6 is a front elevational view of a support member of a further portable and moving device.

FIG. 7 is a side edge view of a pair of identical supports in loading operative positions.

FIG. 8 is an enlarged sectional view on the line 8—8 of FIG. 7.

FIG. 9 is an enlarged view on the line 9—9 of FIG. 6.

Referring to the drawings in detail, the lifting and moving device A includes a first support member 18 which includes the movable U-shaped main frame 20. The support 18 includes the first side channel member 22 and the second spaced side channel member 24. The channel members are connected at the top ends by the top cross member 26.

Secured to and extending from the top of the top cross member 26 is the upper flange 30 and the lower flange 32 and rotatably mounted in the flanges is the rod 34. The numeral 36 designates a cap member mounted on the top end of the rod 34. The cap member has a hole 38 formed therethrough and through which is pivotally positioned the end portion 40 of the handle 42. The end portion of the handle terminates in the right angle portion 44 which in turn terminates in the right angle portion 46 terminating in the right angle main portion 48. The main portion 48 has the right angular outer end 50 on which is rotatably mounted the knob 52.

The rod 34 is threadedly engaged with the nut 35 mounted on the flange 37 connected to the top cross bar 62 of frame 60.

Secured to the top cross member 26 is the handle 54 which includes the end portions 56 and 58 formed on the central portion with each end portion connected to the member 26.

Further provided is the stationary rectangular frame 60 which includes the top cross bar 62 and secured at one end is the side bar 64 and at the other end the side bar 66. The lower ends of the side bars are connected by the bottom cross bar 68. The frame members of frame 16 are of a thickness whereby the the frame is slidable within the channel side members 22 and 24.

The numeral 70 designates an angle member having the upright portion 72 welded to the bottom cross bar 68 with the right angle portion 74 extending in a horizontal position and on which is mounted the conventional casters 76 and 68.

The lower ends of the side channel members 22 and 24 have secured thereto the angle member 80 with the foot portion 82 thereof in a horizontal position for the engagement under an object to be lifted with the upright portion 84 secured to the members 22 and 24.

A second support member 86 is provided which is identical to first support member 18 with like numerals indicating like parts but accompanied by a lower case letter a. It will be seen that the frame 20 is moved up and down on the stationary frame 60 by rotating the rod 34 by means of the handle 42. Each of the channel members 22 and 24 has secured thereto a padding strip 88.

OPERATION

The device A is operated in the following manner. The supports 18 and 86 are placed in juxtaposition as in FIG. 2. Then the main frames 20 and 20a are lowered upon the fixed frame 60 and 60a by means of the threaded rods 34 and 34a and its accompanying elements whereby the foot portions 82 and 82a are lowered to a position upon the surface on which the device is positioned. With the foot portions so positioned, an object is then placed upon the same with both members 18 and 86 placed against the object to be moved. The members 18 and 86 are held together upon the object to be moved by connecting one end of the chain 90 to the threaded draw up hook 92 and the other end of the chain to the hook 94 and drawing up the same. As a result the members 18 and 86 cannot come apart from the object to be moved. With the object so placed on the foot members of the support members, the object is lifted free of the surface by operating the rods 34 and 34a which raises the frames 20 and 86 and thereby the object. The object may then be moved by means of the casters. The object is disengaged from the device by lowering the members 20 and 86 whereby the foot members 82 and 82a are upon a surface supporting the device. At this point the object may be removed from the device.

Referring to FIGS. 6–9, the lifting and moving device B includes a first support member 90 which includes the stationary rectangular main frame 92. The support 90 includes the first side channel member 94 and the second spaced side channel member 96. The channel members are connected at the top ends by the top cross member 98 and at the lower ends by the bottom cross member 100. Secured to the cross member 100 are the spaced conventional casters 102 and 104.

Further provided is the movable H-shaped frame 106 which includes the first hollow side member 108 which is slidably mounted in the first side channel member 94. The frame 106 also includes a second hollow side member 110 slidably mounted in the second side channel member 92. The members 108 and 110 are rigidly connected by the cross members 112. The lower ends of the side members 108 and 110 are spaced from the cross member 100.

Securely mounted on the bottom cross member 100 is the conventional hydraulic lift 114 operated by the handle 116. The upper end 118 of the lift 114 is in contact with the cross member 112. Thus, as the lift 114 is operated the frame 106 is lifted upwardly from the lowermost position shown in FIG. 6 relative to frame 90 and lowered by releasing the lift 114.

Further provided is the first hook 120 which includes the straight flat body portion 122 and formed on the upper end thereof is the hook formation 124 which engages the cross member 100. On the lower end of the body 122 of the hook 120 is the right angular foot 126. A second hook 128 is provided which is identical to hook 120 and identical portions are indicated by identical reference numerals accompanied by a lower case letter a. A handle H for operating the device is formed of the elongated bar portion 130 connected by right angle portions 132 at the ends to the cross member 98.

Secured to the side member 110 is the first angle member 134 on which is secured the pad 136. A second identical angle and pad is secured to the lower portion of side member 110 bearing identical reference numerals but accompanied by a lower case letter a. The side member 108 bears two angle members and pads identical to those on side member 110 which are identified by identical reference numerals accompanied by a lower case letter b.

A second support member 138 is provided which is identical to first support member and identical parts are indicated by identical reference numerals accompanied by a lower case letter a.

Further provided on support 90 is a single length anchoring chain 140 for engagement with an object to be lifted and moved with the device B. The chain 140 is engaged in a slot 142 formed in the top edge of each of the side members 108 and 110 with slack between the members 108 and 110. The chain extends downwardly through both hollow side members 108 and 110 and beyond the lower ends thereof, particularly FIGS. 6 and 9. Each end of the chain 140 has a hook 142.

OPERATION

In using the device B to lift and move an object the movable frame 106 and 106a of each support is lowered by means of the lifts 114 and 114a whereby the feet 126 and 126a of the supports are on the ground. Then the supports 90 and 138 are placed against the object with the feet under the object. The chain 140 is lifted from the slots 142 of the members 108 and 110 whereby the hooks 142 on each end of the chain are connected to the device to be moved and the chain made taught in the slots 142. With the chains connected as above the supports 90 and 138 are held against the object to be moved. With the object so positioned the lifts 114 and 114a are operated thereby raising the object free of the ground. In such a condition the object may be moved about on the supports by means of the casters. In releasing the object from the device, the lifts are actuated to lower the object to the ground. The chains are then disengaged from the object and the supports moved from the object.

Having thus described the invention, what is claimed as new and desired to be secured by Letters Patent is:

1. A portable device for lifting and moving an object comprising:
  a. a first support member including a rectangular stationary frame formed of spaced side bars connected at the upper ends to
  b. a top cross bar and connected at the lower ends to
  c. a bottom cross bar spaced from said top cross bar,
  d. a movable inverted U-shaped frame having spaced side channel members connected at the top by a top cross member,
  e. said stationary frame side members positioned within the side channel members of said movable frame for slidable movement of said movable frame on said stationary frame,
  f. a foot connected to the free end of each of said side channel members,
  g. said side channel members connected at one end to a top cross member, and of a length greater than that of said spaced side bars of said stationary frame so as to be extendable below said bottom cross bar to a position upon a surface upon which the device is placed for engagement of said foot members under an object to be lifted,
  h. means connected to said top cross bar of said stationary frame and said top cross member of said movable frame for slidably lifting said movable frame upon and relative to said stationary frame whereby said foot members raise an object positioned thereon, said means including a screw member threadedly engaged at one end to said top cross bar of said stationary frame and rotatably mounted on said top cross member of said movable frame, and a handle connected to said screw member for rotation of the same,
  i. a second support member identical to said first support member, and
  j. adjustable flexible means connected to said first and second support members for maintaining said first and second support members in close proximity to an object positioned thereon for moving.

* * * * *